(12) United States Patent
Lekas

(10) Patent No.: US 12,236,487 B2
(45) Date of Patent: *Feb. 25, 2025

(54) PROPERTY INSPECTION USING AERIAL IMAGERY

(71) Applicant: Esurance Insurance Services, Inc., San Francisco, CA (US)

(72) Inventor: Stephen Nicholas Lekas, San Francisco, CA (US)

(73) Assignee: Esurance Insurance Services, Inc., San Francisco, CA (US)

( * ) Notice: Subject to any disclaimer, the term of this patent is extended or adjusted under 35 U.S.C. 154(b) by 241 days.

This patent is subject to a terminal disclaimer.

(21) Appl. No.: 16/702,414

(22) Filed: Dec. 3, 2019

(65) Prior Publication Data

US 2020/0104941 A1 Apr. 2, 2020

Related U.S. Application Data

(63) Continuation of application No. 14/331,065, filed on Jul. 14, 2014, now Pat. No. 10,529,026.

(60) Provisional application No. 61/847,055, filed on Jul. 16, 2013.

(51) Int. Cl.
  *G06Q 40/08* (2012.01)
  *G06V 20/10* (2022.01)
  *G06V 20/17* (2022.01)
(52) U.S. Cl.
  CPC .......... *G06Q 40/08* (2013.01); *G06V 20/176* (2022.01)
(58) Field of Classification Search
  CPC .............. G06Q 40/08; G06V 20/176
  USPC ........................................... 705/4
  See application file for complete search history.

(56) References Cited

U.S. PATENT DOCUMENTS

| 7,346,545 | B2 | 3/2008 | Jones | |
|---|---|---|---|---|
| 8,229,768 | B1* | 7/2012 | Hopkins, III | G06Q 40/00 705/1.1 |
| 8,229,769 | B1* | 7/2012 | Hopkins, III | G06Q 10/0635 705/36 R |
| 8,346,578 | B1* | 1/2013 | Hopkins, III | G06Q 30/02 705/14.66 |
| 10,373,256 | B1* | 8/2019 | Allen | G06Q 10/10 |
| 10,713,726 | B1* | 7/2020 | Allen | G06Q 40/08 |
| 10,991,049 | B1* | 4/2021 | Devereaux | G06T 7/73 |
| 2006/0224358 | A1* | 10/2006 | Loyd | B08B 15/00 702/182 |
| 2008/0295582 | A1* | 12/2008 | Lee | G01N 25/72 73/74 |
| 2009/0265193 | A1* | 10/2009 | Collins | G06Q 30/0185 901/46 |
| 2009/0279784 | A1 | 11/2009 | Arcas et al. | |
| 2010/0296694 | A1 | 11/2010 | Little et al. | |

(Continued)

*Primary Examiner* — Robert R Niquette
(74) *Attorney, Agent, or Firm* — Polsinelli PC

(57) ABSTRACT

A method, system and computer-readable medium are provided for performing a property inspection using aerial images, the method including the steps of receiving an indication of a request from a user to receive a quote regarding a property, identifying the property, retrieving one or more aerial images associated with the property, extracting information regarding the property from the one or more aerial images and providing an insurance decision for the property to the user according to the extracted information from the one or more aerial images in response to the request from the user.

18 Claims, 4 Drawing Sheets

(56) References Cited

U.S. PATENT DOCUMENTS

| | | | |
|---|---|---|---|
| 2013/0262029 A1* | 10/2013 | Pershing ................ | G06Q 40/00 |
| | | | 702/156 |
| 2013/0346020 A1* | 12/2013 | Pershing ................ | G01B 21/28 |
| | | | 702/156 |
| 2014/0019166 A1* | 1/2014 | Swanson ................ | G06Q 40/08 |
| | | | 705/4 |
| 2014/0195275 A1* | 7/2014 | Pershing ................ | G06Q 50/16 |
| | | | 705/4 |
| 2014/0358601 A1 | 12/2014 | Smiley et al. | |
| 2015/0044098 A1* | 2/2015 | Smart .................. | A61B 5/0084 |
| | | | 422/82.05 |

* cited by examiner

PROPERTY INSPECTION USING AERIAL IMAGERY

CROSS-REFERENCE TO RELATED APPLICATION

The present application is a Continuation Application of Ser. No. 14/331,065 filed Jul. 14, 2014, entitled "PROPERTY INSPECTION USING AERIAL IMAGERY," claims the benefit of U.S. Provisional Patent Application Ser. No. 61/847,055, entitled "Aerial Home Appraiser," filed on Jul. 16, 2013, which is hereby incorporated by reference in its entirety for all purposes.

BACKGROUND

Field

The present disclosure generally relates to insurance services, and more particularly to property inspection for property insurance.

Description of the Related Art

The homeowner's insurance industry uses certified property inspectors to provide property inspection data. The property inspection data provides risk characteristic information to an insurance carrier to be used by the insurance carrier in rating and underwriting a property's insurance policy. The cost of having the certified property inspector sent to the property is often, however, passed along to the consumer purchasing the insurance policy.

SUMMARY

The disclosed system and method describe performing a property inspection using aerial images.

In certain embodiments, a method is provided for performing a property inspection using aerial images. The method includes the steps of receiving an indication of a request from a user to receive a quote regarding a property, identifying the property, retrieving one or more aerial images associated with the property, extracting information regarding the property from the one or more aerial images and providing an insurance decision for the property to the user according to the extracted information from the one or more aerial images in response to the request from the user.

In certain embodiments, a system is provided for performing a property inspection using aerial images. The system may include one or more processors and a machine-readable medium including instructions stored therein, which when executed by the processors, cause the processors to perform operations including receiving an indication of a request from a user to receive a quote regarding a property, identifying an address associated with the property, retrieving one or more aerial images associated with the address, extracting information regarding the property from the one or more aerial images, applying the extracted information from the one or more aerial images to one or more rules or criteria for determining an insurance decision regarding the property and providing the insurance decision to the user in response to the request in real time, wherein the insurance decision is at least in part based on the extracted information.

In certain embodiments, a non-transitory computer-readable medium having computer-executable instructions stored thereon for execution by a processor to perform a method for performing, a property inspection using aerial images is provided. The method may include the steps of receiving an indication of a request from a user to receive a quote regarding a property, retrieving one or more aerial images associated, with an address of the property, the aerial images including one or more images of the exterior of the property or surrounding areas, extracting information regarding the property from the one or more aerial images and providing an insurance decision for the property to the user at least in part based on applying the extracted information from the one or more aerial images to one or more rules or criteria for determining an insurance decision regarding the property.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
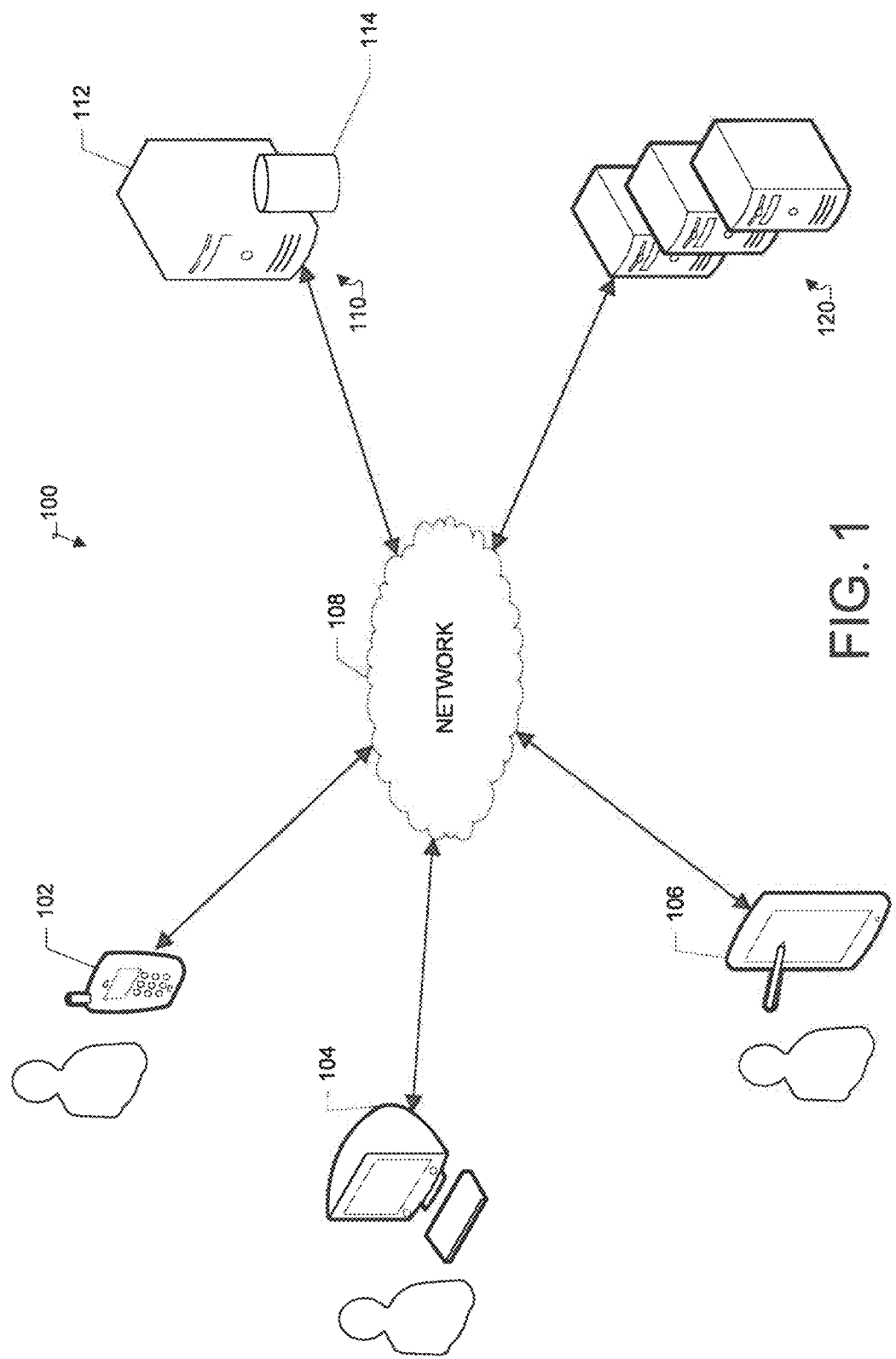
FIG. 1 illustrates an example client-server network environment, which provides for facilitating inspection of a property using aerial imagery.

The detailed description set forth below is intended as a description of various configurations of the subject technology and is not intended to represent the only configurations in which the subject technology maybe practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In other instances, well-known structures and techniques have not been shown in detail so as not to obscure the disclosure.

Some examples provided herein describe identifying and/or storing user property information. In several examples, identification of such information is performed after the user grants explicit permission for such user information to be identified and stored in memory. Each user may be provided notice that such user information will be stored with such explicit consent. The stored user information may be encrypted to protect user security.

The disclosed systems and methods facilitate performing a pre-bind real time, inspection of a property for the purpose of making decisions regarding property insurance using high quality aerial images. The term "property," as used herein, may refer to an improvement to real property, including, for example, semi-permanent and permanent structures and fixtures on real property (e.g. residential or business). Aerial images of property are obtained according to a location identifier of a property. For example, a location identifier may include latitude/longitude information, an address, or other location data indicating the location of the property. The images are processed to obtain information regarding the property. The information is used to provide the user with a real time pre-binding inspection of the property during the insurance quote generation process. In one example, the information may be used for validation and supplementing information provided by the user during the application process. In some examples, the information may be used to fill in certain information of the application (e.g., as opposed to the user filling in the information).

In one aspect, the disclosed system processes an aerial image of a property and analyzes the image to evaluate risk characteristics of the property such as features, size, and condition. The image processing may include object recognition for automatically identifying objects on the property. This information may assist an insurance carrier in providing an accurate assessment policy to a consumer for a property.

In some examples, the aerial images may be captured using various manned and/or unmanned aircrafts, drones, satellites or other apparatuses capable of capturing aerial imagery associated with one or more properties. In one example, the aerial images may be captured in response to receiving the location identifier and identifying the property. In another example, the aerial images may be captured ahead of time and stored in a database. A location identifier of a property may be mapped to various aerial images in one or more databases storing aerial image data for various areas (e.g., areas comprising one of more properties). In certain aspects, the aerial images may include satellite images, thermal images, hyperspectral images or other types of images. Once a customer requests a quote for a property, the location identifier (e.g. address) provided foe the property may be used to retrieve one or more aerial images associated with the property. The images may be used to determine information regarding the property. The information may be used to validate and/or supplement existing information, for example, provided by the user during the application process.

In one example, the information obtained through the aerial imagery may include information that is traditionally obtained through a manual exterior inspection of the property by an inspector. The processing of images may include using image recognition processes to identify various image data within the images. The image data is used to generate information regarding the property. The information is then used to provide the user with a binding decision regarding insuring the property in real time. The decision may include a rate when the information indicates that the information regarding the property meets the criteria for insuring a property, steps to be taken to obtain insurance where the information regarding the property meets a second criteria (e.g. a lower criteria indicating issues that may have to be resolved) and/or a decision to not offer insurance to the customer.

In some examples, aerial imagery inspections, performed according to the systems and processes disclosed herein, provide for cost savings for both an insurance provider and a consumer, a record of inspection, information on a property's condition and improvements in ease of reconstruction cost estimation, marketing opportunity for additional insurance offering and sales, and bulk data gathered for use in product development and product pricing. When aerial imagery is used, the inspection process can eliminate the need for an inspection performed physically. This may lead to cost efficiency, less error, and further may provide for a quicker inspection (e.g., as an actual inspector does not need to be engaged to visit the property and complete the inspection). In one example, the reduction in delay in performing the inspection (e.g. performing the inspection in real-time or with a limited delay) may facilitate providing the customer with a binding decision sooner than would usually be standard with traditional insurance underwriting methods.

For example, performing an inspection (e.g., in real time or near real time), before a binding coverage decision is made and/or before coverage is bound provides several advantages to both the customer (e.g. potential or future customer) and the insurance provider. Because the inspection process can be done with less delay (e.g., in real time or near real time), using aerial images, the risk of the coverage decision (e.g. rate) offered to the customer being cancelled or updated after purchasing property insurance policy, (e.g. based on an increased cost of coverage due to a condition or characteristics of a property being discovered via an after the fact inspection) is greatly reduced. Furthermore, providing a faster inspection process using the aerial imagery inspection reduces the chance of the insurance carrier being bound to a risk that is not yet fully underwritten (e.g. opposed to a traditional in person inspection commonly being completed over the course of 30 days after insurance coverage is bound). The cost per year inspection may also be reduced (e.g., when used with significant volume) by using aerial inspection imagery instead of physical inspection, which leads to less cost being passed onto the customer. The real time inspection further allows for providing the user with transparency regarding how the coverage decision is made, as the user may be presented with results of the inspection in real time, before or upon being presented with a coverage decision, giving the more confidence and assurance regarding the coverage offered. In one example, where aerial imagery is obtained during the quote generation process, the information extracted can be used for marketing purposes (e.g., to recommend additional insurance to the user for the property).

The use of aerial imagery inspection during the coverage decisions is described herein as an example use ease of the processes and systems described herein. Same or similar inspections may be performed in other contexts. For example, the disclosed system permits assessing damage potential for a property after a covered loss event to determine settlement. Similarly, aerial imagery inspections may be performed to make renewal decisions that can be presented to the customer without needing additional efforts from the customer. In another example, the aerial inspection may be performed for appraising property value.

FIG. 1 illustrates an example client-server network environment, which provides for facilitating inspection of a property using aerial imagery. A network environment 100 includes a number of electronic devices 102, 104, 106 communicably connected to a server 110 and one or more remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, or other appropriate computing devices. In some examples, electronic devices 102, 104, 106 have an image capturing capability. In the example of FIG. 1, electronic device 102 is depicted as a smartphone, electronic device 104 is depicted as a desktop computer and electronic device 106 is depicted as a Personal Digital Assistant (PDA).

In some implementations, server 110 includes a processing device 112 and a data store 114. Processing device 112 executed computer instructions stored in data store 114, for example, to facilitate performing an inspection of a property using aerial imagery. Server 110 may further be in communication with remote servers 120 either through the network 108 or through another network or communication means.

Remote servers 120 may be configured to perform various functionalities and/or storage capabilities described herein with regard to the server 110 either alone or in combination with server 110. Server 110 may maintain or be in communication with image recognition services, location services, property valuation services, insurance services and/or other services hosted on one or more remote servers 120. In some examples, remote servers 120 may host services generating and/or maintain databases or aerial imagery.

In some examples aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through various communication protocols. In some aspects, client devices 102, 104, 106, and server 110 and/or one or more remote servers 120 may communicate wirelessly through a communication interface (not shown), which may include digital signal processing circuitry where necessary. The communication interface may provide for communications under various modes or protocols, including Global System for Mobile communication (GSM) voice calls, Short Message Service (SMS). Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA, CDMA2000, or General Packet Radio System (GPRS), among others. For example, the communication may occur through a radio-frequency transceiver (not shown). In addition, short-range communication may occur, including using a Bluetooth, WiFi, or other such transceiver.

Users may interact with the system hosted by server 110, and/or one or more services hosted by remote servers 120, through a client application installed at the electronic devices 102, 104, and 106. Alternatively, the user may interact with the system and the one or more services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

A customer ("user") (e.g., a customer or potential customer) at a client device (e.g., client device 102, 104 or 106) may access an application (e.g. hosted by server 110) to initiate a request for a quote from an insurance carrier. The user may provide an identifier or indication of the location of the property, such as an address (e.g., business or residential address), for the property to be insured. Server 110 may determine latitude and longitude of the property based on the provided identifier and request aerial imagery of the property (e.g. from one or more remote servers 120). The aerial images are processed to determine, for example, risk characteristics and conditions information of the property. The risk characteristics can include, but are not limited to, square footage (e.g., of the property or a portion of the property such as a roof), a slope of the property, type/quality/wear of construction components, chemical composition, and energy leakage. Insurance rating and underwriting rules are applied to the risk characteristics data and conditions information to determine a coverage decision. The coverage decision is provided for display at the client device for the user. The data, images and information may be stored for later reference. For example, the information may be used to determine historical metrics regarding insured properties. In one example, a pattern of correlation between upkeep and maintenance and loss value or properties may be determined according to the information over time.

Figure 2:
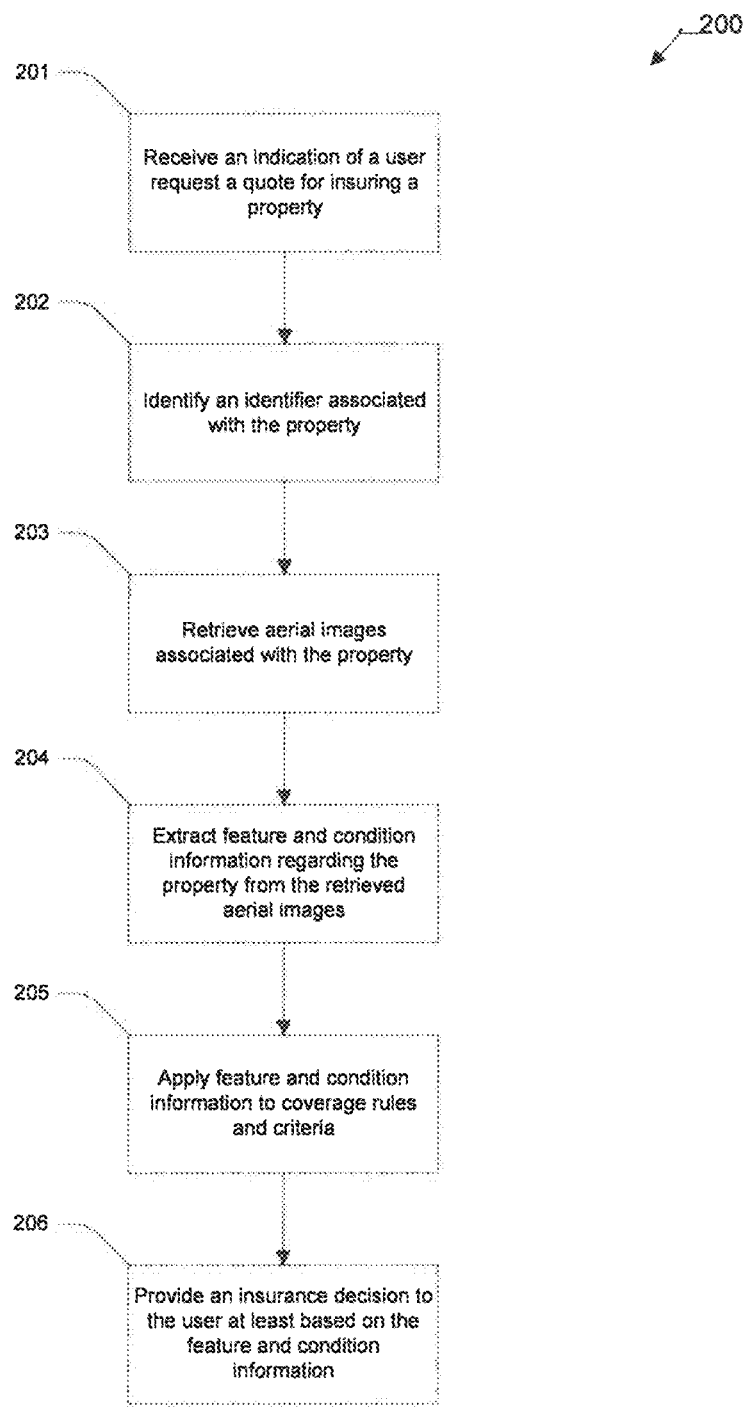
FIG. 2 illustrates an example process for facilitating inspection of a property using aerial imagery.

FIG. 2 illustrates an example process 200 for facilitating inspection of a property using aerial imagery. In step 201, an indication of a user request to receive a quote on insuring a property is received. For example, a user may log on or access an application (e.g. a client application hosted by server 110) and may request to receive a quote for insuring a property. The user may be asked to provide a location identifier for the property. In one example, an application is provided to the user to obtain user provided information regarding the property.

Figure 3:
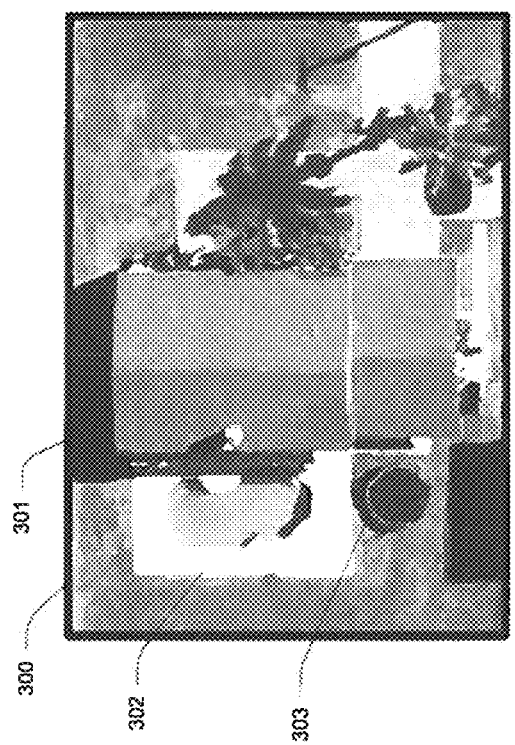
FIG. 3 illustrates an example aerial image of a home.

In step 202, an identifier associated with the property is identified. For example, the identifier may comprise an address of the property entered by the user. In step 203, aerial images associated with the property are retrieved. In one example, the identifier of the property is used to retrieve the aerial images. In one example, the identifier may include latitude and longitude (or a mapping of the latitude and longitude with 3D space) representing the location of the property, and may be used to identify and/or capture aerial images associated with the property. In another example, the identifier may include an address of the property used to identify the property, and to capture and/or retrieve aerial imagery associated with the property. In one example, the aerial images may be captured in response to receiving the location identifier and identifying the property. In another example, the aerial images may be captured ahead of time and stored in a database. In some examples, on or more databases may store various types of aerial imagery mapped to different latitude/longitude (or corresponding mapping in 3D space). In another example, the aerial imagery may be mapped to the address of a property. The aerial imagery may include satellite images (e.g., 2D, 3D images), thermal imagery, hyperspectral imagery, and/or other images captured that may provide information regarding features and/or condition of the property. In some examples, the aerial images may be captured using various manned and/or unmanned aircrafts, drones, satellites or other apparatuses capable of capturing aerial imagery associated with one or more properties. The imagery may include images of the property and surrounding areas. In some examples, imagery of different zoom levels (e.g. detailed property images, as well as, images of the area including the property) may be associated and/or retrieved in association with the property. FIG. 3 illustrates an example aerial imagery 300 of a property that may be retrieved in step 203. The aerial imagery 300, for example, illustrates a main structure 301 (e.g., the actual home), a pool 302, a trampoline 303, and the surrounding area of the property.

In step 204, feature and condition information regarding the property may be extracted from the retrieved aerial images. In one example, an image recognition algorithm may be applied to the images to extract applicable information from the images. The information, in certain implementations, may include shape of structures and parcel. The information may include size and feature information (e.g. square footage) for the main structure, detached structures (garages, sheds, barns, etc.) and/or land. For example, for each structure, the feature and size information may include, age, measurements (e.g., height, length, square footage), material and/or composition information of different elements. The information may, for example, include information regarding the roof (e.g., roof covering material and shape, with a detailed breakdown, including all surfaces, and slopes), exterior wall (e.g. exterior wall covering type and material) and/or interior walls (e.g. length). The information may include information regarding presence and size/shape of attached structures such as garages, breezeways, decks, porches, fence, and information regarding size (e.g. length), type and materials of the detached structures. The information may further include overall property information including, land use percentage, slope of property, ground coverings, number of stories within one or more structures of the property, foundation type and material, and pier height. In some embodiments, the information may further include distance to fire hydrant, site access and easy of property accessibility and/or presence of an external AC unit.

In some examples, the imagery may further include information regarding the energy leakage of the property. For example, in certain aspects thermal images may provide heat information indicative of energy leakage. Composition and material information regarding various elements and structures may be determined according to the imagery. In certain aspects hyperspectral images are used to determine a chemical composition of portions of a property (e.g., composition of shingles materials).

Wear and tear information regarding the property may further be determined based on the imagery. For example, a comparison of chemical composition and energy escape to known indexes of "normal" at various ages of useful life or expected life of the property may indicate if the level of wear and tear of a property is within an acceptable or normal range. For example, the expected life or useful life of various features of the property, such as the roof, driveway, walls, or other visible parts of the property including material of certain chemical compositions, may be determined using the imagery.

Neighborhood information may further be extracted or derived from the images. The neighborhood information may include neighborhood type information (e.g. urban, rural, suburban, developed or undeveloped), distance of property to neighboring properties, distance of property to commercial activity, distance from property to the coast and/or other water, or presence of other risk factors within the vicinity of the property (e.g. fire hazards).

In step 205, the feature and condition information regarding the property extracted in step 204 is applied to a set of coverage rules and/or criteria. The rules and/or criteria may include thresholds and algorithms for determining eligibility and coverage information regarding the property. In one example, user provided information may be combined and/or validated using the extracted information and the combined/validated information may be applied to a set of rules and/or criteria to determine eligibility and coverage (e.g., rate) information for the property. The rules and criteria may define one or more thresholds that must be met for eligibility. The rules and criteria may further include algorithms for calculating a rate based on the property information (e.g. user provided information, information extracted from imagery and/or other information provided from various other sources).

In step 206, an insurance decision regarding the property is provided for display to the user. The insurance decision is made based on one or more sets of information including the extracted information. In one example, the decision is based on the results of applying the feature and condition information to the rules and criteria. In some examples, the decision may include determining that the application is in good order, and a rate and/or other details of the insurance policy may be determined and/or provided to the user. In another example, the decision may include determining that further information is needed. For example, a representative may, after reviewing compiled information (e.g. the captured images and/or existing information), contact the user if any additional information is needed. In some examples, the decision may include determining that the property cannot be insured based on the information. Similar virtual inspections may also be performed during the lifetime of the insurance, for example, at time of renewal, or adjustment to the policy.

In some examples, the steps of the process 200 are performed in real time such that the quote provided to the user is based on the information extracted from the aerial imagery (e.g., in comparison with the traditional model where the inspection is performed after the insurance decision is presented to the user and overwrites and/or modifies the decision).

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMS, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled of interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
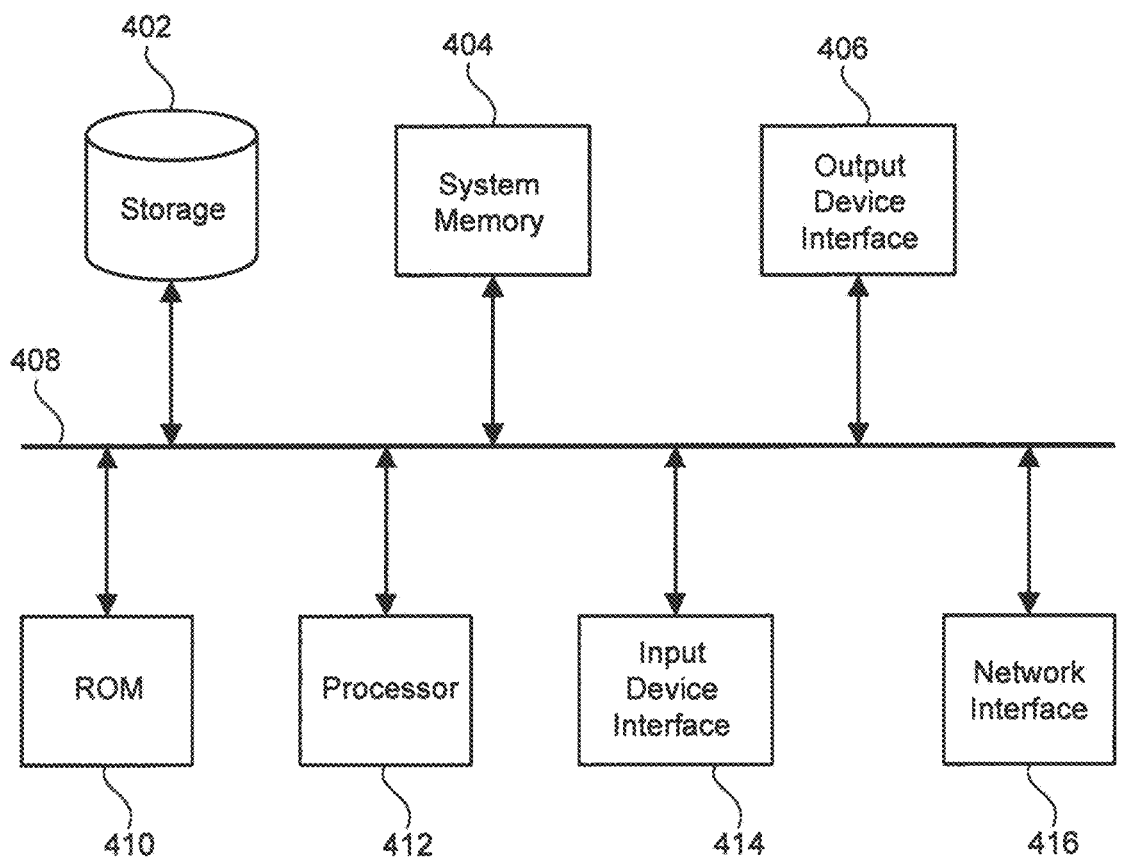
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for performing a property inspection using aerial images according to various implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety or recordable/rewritable DVDs (e.g., DVD-RAM, DVD-RW, DVD+RW, etc.) flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy discs. The computer-readable media can store a computer program that is executable by at least one processing unit and includes sets of instructions for performing various operations. Examples of computer programs or computer code include machine code, such as is produced by a compiler, and files including higher-level code that are executed by a computer, and electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such as integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well, for example, feedback provided to the user can be any form of sensory feedback e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., and application server, or that includes a front end component, e.g., a client computer having a graphical user interface or a Web browser through which a user can interact with an implantation of the subject matter described in this specification, or any combination of one or more such back end, middleware, or front end components. The components of the system can be interconnected by any form or medium of digital data communication, e.g., a communication network. Examples of communication networks include a local area network and a wide area network, an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In the previous detailed description, numerous specific details have been set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

The previous description is provided to enable any person skilled in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more, Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as 'top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 34 U.S.C § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for performing a property inspection using aerial images, comprising:
   receiving, via a network interface, input data including a first request from a user to receive a quote regarding a property and a location identifier associated with the property, the input data received from a client device using a client application;
   identifying the property based on the input data;
   retrieving one or more aerial images associated with the property by identifying the one or more aerial images from a database using the location identifier associated with the property, the one or more aerial images including thermal imagery and hyperspectral imagery;
   generating chemical composition data associated with the property by executing a hyperspectral imaging algorithm applied to the hyperspectral imagery associated with the property;
   generating energy leakage data associated with the property by executing an image recognition algorithm applied to the thermal imagery associated with the property;
   generating wear data regarding the property by comparing the chemical composition data and the energy leakage data to one or more indexes;
   generating a coverage result for the property in response to the first request from the user in real time, wherein the coverage result is based on the wear data;
   generating output data, the output data including the coverage result; and
   providing the output data to the client application to cause display of the coverage result for the property on the client device.

2. The method of claim 1, wherein generating the coverage result comprises: applying the wear data to one or more rules or criteria for generating the coverage result for the property.

3. The method of claim 1, wherein the aerial images include images of an exterior of the property.

4. The method of claim 1, wherein the aerial images include images of surrounding areas of the property.

5. The method of claim 1, wherein identifying the property comprises determining an address associated with the property.

6. The method of claim 1, wherein identifying the property comprises determining a latitude and longitude of the property.

7. The method of claim 1, wherein retrieving one or more aerial images associated with the property comprises:
   sending a second request to one or more remote services storing aerial imagery, the second request including an identification of the property; and
   receiving the one or more aerial images in response to the second request.

8. The method of claim 1, wherein the one or more aerial images includes one or more 2D or 3D satellite images.

9. The method of claim 1, further comprising:
   generating, via the image recognition algorithm applied to the one or more aerial images, information data, wherein the information data includes size information regarding the property.

10. The method of claim 1, further comprising generating, via the image recognition algorithm applied to the one or more aerial images, information data, wherein the information data includes feature information regarding the property.

11. The method of claim 1, further comprising:
    generating, via the image recognition algorithm applied to the one or more aerial images, information data, wherein the information data includes composition information regarding one or more elements of the property.

12. The method of claim 1, further comprising comparing the chemical composition data with energy leakage information to generate the coverage result.

13. The method of claim 1, further comprising:
    generating, via the image recognition algorithm applied to the one or more aerial images, information data, wherein the information data includes wear and tear information.

14. The method of claim 1, wherein the property includes an improvement on real property.

15. The method of claim 1, wherein the property includes one or more of a main structure, one or more detached structures, one or more fixtures, and land, the land housing one or more of the main structure, the one or more detached structures and the one or more fixtures.

16. The method of claim 1, wherein the coverage result is provided to the user in real time.

17. A system for performing a property inspection using aerial images, the system including:
    one or more processors; and
    a machine-readable medium including instructions stored herein, which when executed by the one or more processors, cause the one or more processors to perform operations comprising:
       receiving input data, the input data including a request from a user to receive a quote regarding a property and a location identifier associated with the property, the input data received from a client device using a client application;
       identifying an address associated with the property using the location identifier associated with the property;
       retrieving one or more aerial images associated with the address using image recognition, the one or more aerial images including thermal imagery and hyperspectral imagery;
       generating chemical composition data associated with the property by executing a hyperspectral imaging algorithm applied to the hyperspectral imagery associated with the property;
       generating energy leakage data associated with the property by executing an image recognition algorithm applied to the thermal imagery associated with the property;
       generating wear data regarding the property by comparing the chemical composition data and the energy leakage data to one or more indexes;
       generating a coverage result regarding the property in response to the request from the user in real time by applying the wear data generated from the one or more aerial images to one or more rules or criteria, the coverage result generated in response to the request in real time;

generating output data, the output data including the coverage result; and providing the output data to the client application to cause display of the coverage result on the client device.

18. A non-transitory computer-readable medium having computer-executable instructions stored thereon for execution by a processor to perform a method, the method comprising:

receiving input data including a request from a user to receive a quote regarding a property and a location identifier associated with the property, the input data being received from a client device using a client application;

retrieving one or more aerial images associated with an address of the property by identifying the one or more aerial images from a database using the location identifier associated with the property, the one or more aerial images including thermal imagery and hyperspectral imagery and one or more images of an exterior of the property or surrounding areas;

generating chemical composition data associated with the property by executing a hyperspectral imaging algorithm applied to the hyperspectral imagery associated with the property;

generating energy leakage data associated with the property by executing an image recognition algorithm applied to the thermal imagery associated with the property;

generating wear data regarding the property by comparing the chemical composition data and the energy leakage data to one or more indexes;

generating a coverage result for the property at least in part based on applying the wear data to one or more rules of criteria, the coverage result generated in response to the request from the user in real time;

generating output data, the output data including the coverage result; and providing the output data to the client application to cause display of the coverage result on the client device.

* * * * *